United States Patent
Guillot et al.

(10) Patent No.: US 11,012,120 B2
(45) Date of Patent: May 18, 2021

(54) SYSTEM COMPRISING A RACK AND A LINE REPLACEABLE MODULE

(71) Applicants: SAFRAN ELECTRONICS & DEFENSE, Boulogne Billancourt (FR); SAFRAN ELECTRICAL & POWER, Blagnac (FR)

(72) Inventors: François Guillot, Boulogne Billancourt (FR); Jean-Marc Blineau, Boulogne-Billancourt (FR); Philippe Avignon, Boulogne-Billancourt (FR); Serge Roques, Boulogne-Billancourt (FR); Franck Albero, Boulogne-Billancourt (FR)

(73) Assignees: Safran Electronics & Defense, Boulogne Billancourt (FR); Safran Electrical & Power, Blagnac (FR)

( * ) Notice: Subject to any disclaimer, the term of this patent is extended or adjusted under 35 U.S.C. 154(b) by 56 days.

(21) Appl. No.: 16/604,951

(22) PCT Filed: Apr. 11, 2018

(86) PCT No.: PCT/EP2018/059332
§ 371 (c)(1),
(2) Date: Oct. 11, 2019

(87) PCT Pub. No.: WO2018/189264
PCT Pub. Date: Oct. 18, 2018

(65) Prior Publication Data
US 2020/0127706 A1  Apr. 23, 2020

(30) Foreign Application Priority Data
Apr. 12, 2017  (FR) .................... 17 53231

(51) Int. Cl.
*H04B 5/02* (2006.01)
*B64D 47/00* (2006.01)
(Continued)

(52) U.S. Cl.
CPC ............... *H04B 5/02* (2013.01); *B64D 47/00* (2013.01); *H01Q 23/00* (2013.01); *H04W 72/042* (2013.01); *B64D 2221/00* (2013.01)

(58) Field of Classification Search
CPC ........... H04B 5/02; H01Q 23/00; B64D 47/00
See application file for complete search history.

(56) References Cited

U.S. PATENT DOCUMENTS

| 6,173,899 B1 | 1/2001 | Rozin |
| 6,394,815 B1* | 5/2002 | Sarno ................... H05K 7/1449 361/788 |

(Continued)

FOREIGN PATENT DOCUMENTS

| EP | 2 114 019 A1 | 11/2009 |
| FR | 2 783 392 A1 | 3/2000 |

(Continued)

*Primary Examiner* — Md K Talukder
(74) *Attorney, Agent, or Firm* — Muncy, Geissler, Olds & Lowe, P.C.

(57) ABSTRACT

A system comprising a rack and at least one line replaceable module, the rack further comprising a primary transmission circuit comprising a primary antenna, primary emission components designed to generate an emitted power containing uplink data, and primary receiving components designed to receive downlink data, the line replaceable module comprising a secondary transmission circuit comprising a secondary antenna, secondary receiving components designed to receive the emitted power and the uplink data, and secondary emission components designed to generate the downlink data, the emitted power, the uplink data and the (Continued)

downlink data being transmitted via a shared coupling between the primary antenna and the secondary antenna.

16 Claims, 3 Drawing Sheets

(51) Int. Cl.
*H01Q 23/00* (2006.01)
*H04W 72/04* (2009.01)

(56) References Cited

U.S. PATENT DOCUMENTS

| | | | | |
|---|---|---|---|---|
| 2008/0267112 A1* | 10/2008 | Lucidarme | ............... | H04B 5/02 |
| | | | | 370/315 |
| 2012/0319916 A1* | 12/2012 | Gears | .................... | H01Q 1/246 |
| | | | | 343/841 |
| 2012/0326657 A1* | 12/2012 | Oettinger | ................ | H04L 7/042 |
| | | | | 320/108 |
| 2016/0211823 A1* | 7/2016 | Klemens | ................. | H03F 1/565 |
| 2017/0048937 A1* | 2/2017 | Wang | ....................... | H02J 50/10 |
| 2018/0219334 A1* | 8/2018 | Kahlman | ............ | G06F 13/4063 |
| 2020/0127706 A1* | 4/2020 | Guillot | ................... | H01Q 23/00 |

FOREIGN PATENT DOCUMENTS

| | | | |
|---|---|---|---|
| GB | | 2 211 360 A | 6/1999 |
| WO | WO 2007/104365 A1 | | 9/2007 |

\* cited by examiner

SYSTEM COMPRISING A RACK AND A LINE REPLACEABLE MODULE

BACKGROUND OF THE INVENTION

In many industrial fields, and in particular in the field of aeronautics, the designers of electrical systems often incorporate in the electrical systems LRMs (for Line Replaceable Modules). Several line-replaceable modules are thus grouped together in racks to form centralized and modular structures. The use of line-replaceable modules offers many advantages.

The use of line-replaceable modules makes it possible in particular to pool certain functions associated with the operation of said line-replaceable modules: power supply, communication, cooling, etc. The use of line-replaceable modules also makes it possible to provide significant modularity, to facilitate the operations of maintenance and replacement of the line-replaceable modules and, obviously, to reduce the costs associated with the line-replaceable modules (development, production, test, certification, and other costs).

In the production phase of a line-replaceable module, the aim is to facilitate the implementation of self-test functions of the line-replaceable module, which have to be sufficiently broad and automated. There is also an aim to facilitate the downloading of software configurations. And there is an aim to limit the risk of damage to the connection system (which is tested also by simple equipotential checking means). The pins of a connector can in particular be twisted at the time of connection of the line-replaceable module or else when the line-replaceable module is dropped.

It is therefore important to eliminate the manual operations for launching the self-test functions and for downloading the software configurations. It is also important, during the implementation of the self-test functions, to be able to check the operational state of the line-replaceable module as a whole. It should moreover be possible to download the basic functionalities, and be possible to test them without interfering with the preceding requests.

In storage phase, the line-replaceable module should be able to be conserved without degradation sometimes for several years, while allowing, at any moment, a download of a new software configuration that meets the needs of the aircraft.

It is therefore important here again to eliminate the manual operations for downloading the software configurations. It is also important to protect the line-replaceable module against moisture, dust and mechanical attacks such as impacts. Furthermore, it is important to maintain the performance levels of the electronic components of the line-replaceable module in long-term storage (sometimes for several years). It should also be possible to check the operational state of the line-replaceable module as a whole. In addition, it should be possible to download new software configurations and new functionalities, and to be able to test them without interfering with the preceding requests. Lastly, it should be possible to conserve the navigability of a line-replaceable module after it has been reconfigured, that is to say not compromise its certification on each reconfiguration.

In operational phase, the line-replaceable module should be able to self-test regularly and should allow the downloading of new software configurations.

It is therefore important to be able to check the operational state of the line-replaceable module as a whole. In addition, it should be possible to download new software configurations and new functionalities, and to be able to test them without interfering with the preceding requests. The integrated self-test functions should cover the application upgrades which will be downloaded directly to the aircraft.

It is also important to conserve the compatibility of the line-replaceable module with the requirements concerning electromagnetic compatibility and lightning.

SUBJECT OF THE INVENTION

The subject of the invention is a system comprising a rack and a line-replaceable module, which meets the requirements listed above.

SUMMARY OF THE INVENTION

In order to achieve this aim, a system is proposed that comprises a rack and at least one line-replaceable module, the rack comprising a slot for accommodating the line-replaceable module, the rack further comprising a primary transmission circuit comprising a primary antenna, primary emission components arranged to generate an emitted power containing uplink data, and primary reception components arranged to receive downlink data, the line-replaceable module comprising a secondary transmission circuit comprising a secondary antenna, secondary reception components arranged to receive the emitted power and the uplink data, and secondary emission components arranged to generate the downlink data, the emitted power, the uplink data and the downlink data being transmitted via one and the same coupling between the primary antenna and the secondary antenna.

The system according to the invention therefore makes it possible, during phases which have just been described, to download new software configurations and to power up components of the line-replaceable module without it being necessary to open the line-replaceable module or to connect it to external equipment via its connection system.

The line-replaceable module can moreover be packaged in a sealed protective cover, in particular during the storage phase. The transmission of power and the communications are performed through the protective cover, without it being necessary to open the latter. The line-replaceable module is thus protected from external attacks.

Also proposed is a method for storing a line-replaceable module in a rack of the system which has just been described, the storage method comprising the steps:
of packaging the line-replaceable module in a tight and electrically insulating protective cover;
of sealing the protective cover;
of positioning the line-replaceable module in the slot of the rack.

Further proposed is a line-replaceable module comprising a secondary transmission circuit comprising a secondary antenna, secondary reception components arranged to receive an emitted power and uplink data contained in the emitted power, and secondary emission components arranged to generate downlink data, the line-replaceable module being arranged to implement the storage method which has just been described.

Lastly, an avionics rack is proposed that comprises a box and a plurality of line-replaceable modules such as that which has just been described, the avionics rack comprising an electrically conductive element positioned with respect to the line-replaceable modules to render the secondary antennas of the line-replaceable modules inoperative.

Other features and advantages of the invention will emerge on reading the following description of a particular nonlimiting embodiment of the invention.

BRIEF DESCRIPTION OF THE DRAWINGS

Reference will be made to the attached drawings, in which.

DETAILED DESCRIPTION OF THE INVENTION

The invention is illustrated here in a situation in which a plurality of line-replaceable modules are stored, in storage phase, in a storage rack. The line-replaceable modules are each intended to be incorporated, at the end of the storage phase, in an embedded system of an aircraft.

The storage rack comprises a plurality of slots intended to each accommodate a line-replaceable module.

Each slot of the storage rack comprises a primary transmission circuit, here called "primary circuit". Each line-replaceable module comprises a secondary transmission circuit, here called "secondary circuit".

The primary circuit of a slot of the storage rack and the secondary circuit of the line-replaceable module positioned in said slot are arranged to implement, between said slot and the line-replaceable module, a transmission of power, an uplink communication and a downlink communication.

The transmission of power is an emission at low frequency f0 of an emitted power generated by the primary circuit intended for the secondary circuit.

The uplink communication is a transmission at low frequency f0 of uplink data generated by the primary circuit intended for the secondary circuit.

The bit rate of the uplink data in the uplink communication is a low bit rate lying between 100 kb/s and 1 Mb/s.

The downlink communication is a transmission at high frequency f1 of downlink data generated by the secondary circuit intended for the primary circuit.

The bit rate of the downlink data in the downlink communication is a high bit rate, higher than the low bit rate and lying between 10 Mb/s and 100 Mb/s.

The primary circuit comprises a primary antenna, and the secondary circuit comprises a secondary antenna.

The transmission of power, the uplink communication and the downlink communication are performed via one and the same electromagnetic coupling between the primary antenna and the secondary antenna. The electromagnetic coupling is, in this case, an inductive coupling. The inductive coupling requires a certain proximity between the primary antenna and the secondary antenna. Advantageously, the primary antenna and the secondary antenna are situated facing one another and at a distance of between 0.1 cm and 20 cm.

Figure 1:
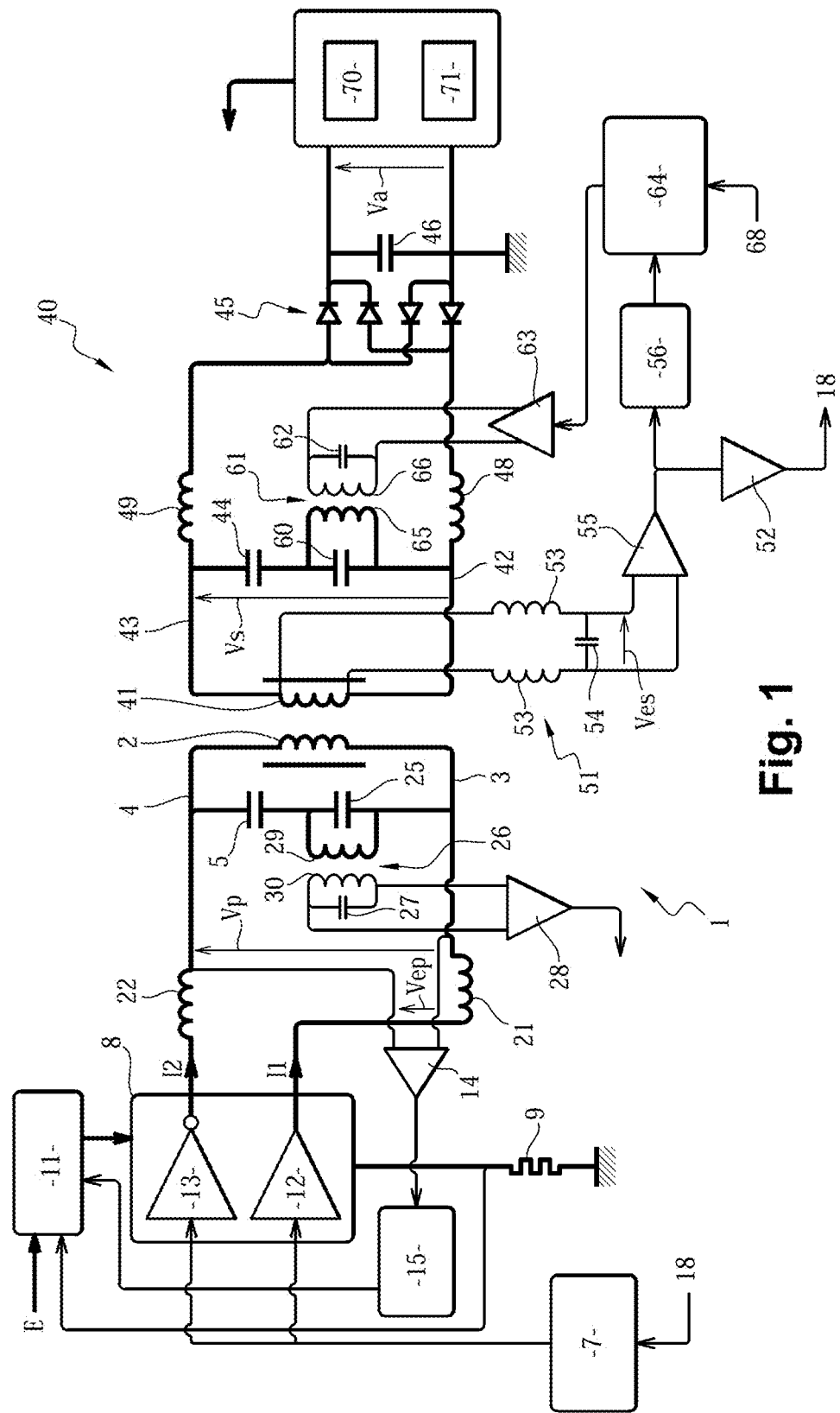
FIG. 1 represents a primary transmission circuit of a rack (or primary circuit) and a secondary transmission circuit of a line-replaceable module (or secondary circuit) of a system according to the invention.
Figure 2:
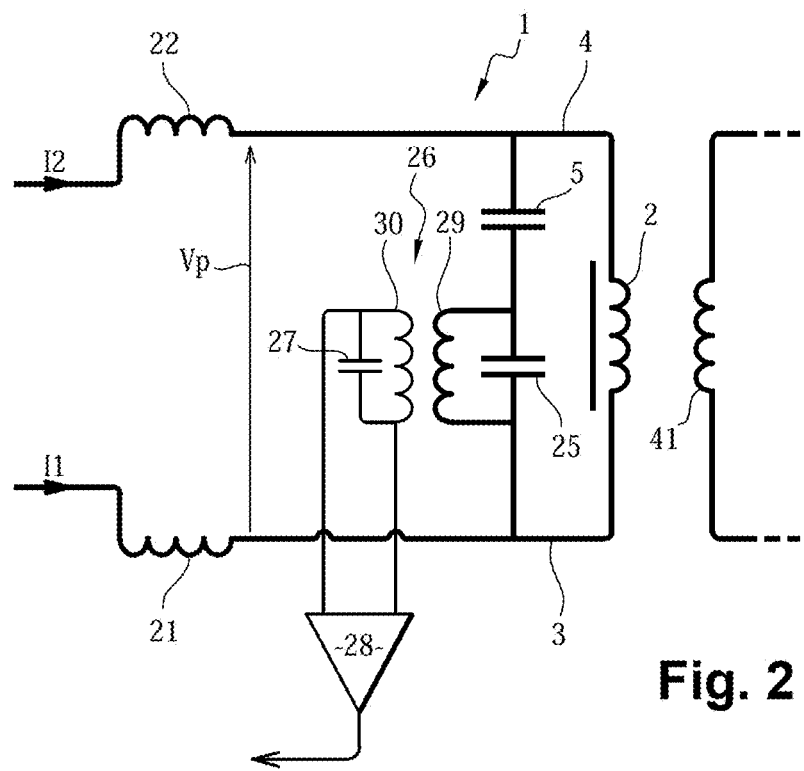
FIG. 2 represents the primary circuit.

Referring to FIGS. 1 and 2, the primary circuit 1 comprises, first of all, the primary antenna which, here, is a winding of conductive wire exhibiting a first primary inductance 2. The first primary inductance 2 comprises two terminals, of which one is linked to a first primary conductor 3 and the other is linked to a second primary conductor 4.

A first primary capacitance 5 is mounted in parallel to the first primary inductance 2. The value of the first primary inductance 2 and the value of the first primary capacitance 5 are chosen so that the first primary inductance 2 and the first primary capacitance 5 form a first primary resonant circuit at the low frequency f0.

To generate the emitted power and the uplink data, the primary circuit 1 comprises primary emission components here comprising a two-phase generator L 7, a power bridge 8, a current sensor 9, a voltage sensor and a primary servocontrol module 11.

The power bridge 8 comprises a non-inverting amplifier 12 of which an output is connected to the first primary conductor 3, and an inverting amplifier 13 of which an output is connected to the second primary conductor 4.

The voltage sensor comprises acquisition components 14 and measurement components 15.

Figure 3:
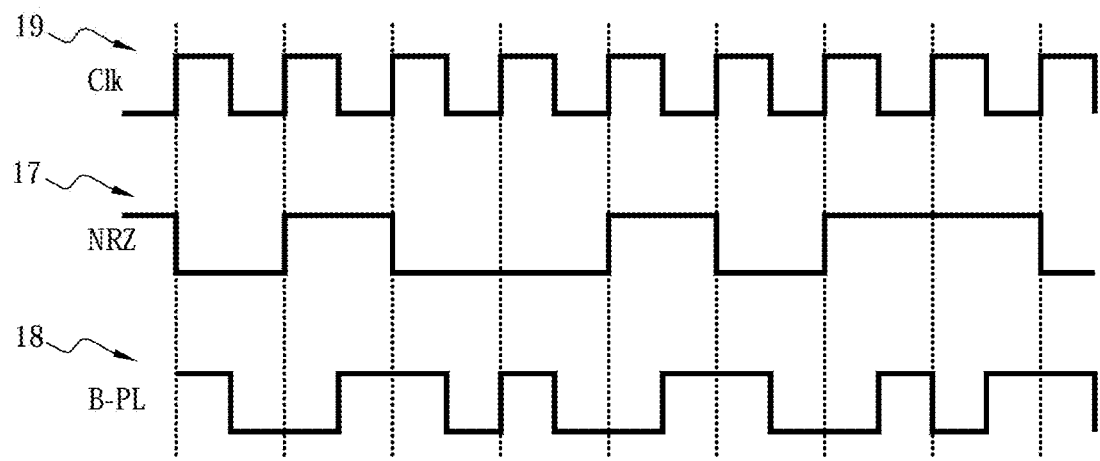
FIG. 3 represents uplink data transmitted to the secondary circuit by the primary circuit.

Referring to FIG. 3, NRZ-coded uplink data 17 are transmitted to the two-phase generator L 7 which transforms the NRZ-coded uplink data 17 into two-phase L-coded uplink data 18. The CLK signal is a clock signal 19 which paces the NRZ-coded uplink data 17 and the two-phase L-coded uplink data 18.

The two-phase L-coded uplink data 18 are the uplink data at low frequency f0 transmitted by the primary circuit 1 to the secondary circuit in the uplink communication.

The uplink data 18 are transmitted to the non-inverting amplifier 12 and to the inverting amplifier 13.

When an uplink datum 18 corresponds to an NRZ low state, the non-inverting amplifier 12 generates, in the first primary conductor 3, a first primary current I1 according to a carrier frequency equal to the low frequency f0.

When an uplink datum 18 corresponds to an NRZ high state, the inverting amplifier 13 generates, in the second primary conductor 4, a second primary current I2 according to a carrier frequency equal to the low frequency f0.

The second primary current I2 is phase-shifted by 180° relative to the first primary current I1, and is therefore in phase inversion relative to the first primary current I1.

The first primary resonant circuit makes it possible to maximize the primary voltage Vp generated by the first primary current I1 and the second primary current I2 at the terminals of the first primary resonant circuit.

The primary voltage Vp, the first primary current I1 and the second primary current I2 therefore form the emitted power which is transmitted to the secondary circuit via the inductive coupling.

Note that the use of the two-phase L coding makes it possible to obtain an emitted power of zero average component, which makes it possible to more effectively transmit the emitted power via the inductive coupling between the primary antenna and the secondary antenna.

The transmission of power and the uplink communication therefore use the same uplink electrical signals: the uplink data are contained in the emitted power.

The current sensor 9 measures the current consumed by the power bridge 8 to generate the first primary current I1 and the second primary current I2. The current measurements are acquired by the primary servocontrol module 11.

The acquisition components 14 of the voltage sensor acquire a primary excitation voltage Vep, equal to the primary voltage Vp, at the terminals of the first primary resonant circuit. The measurement components 15 of the voltage sensor measure the level of the primary excitation voltage Vep and transmit it to the primary servocontrol module 11.

In addition to the measurements of the current consumed by the power bridge 8 and of the primary excitation voltage Vep, the primary servocontrol module 11 receives the energy E necessary to the operation of the power bridge 8.

The primary servocontrol module 11 thus implements a first servocontrol loop in the primary circuit 1, to define the points of operation of the non-inverting amplifier 12 and of the inverting amplifier 13.

The primary circuit 1 further comprises a first primary filtering inductance 21 mounted on the first primary conductor 3 and a second primary filtering inductance 22 mounted on the second primary conductor 4. The first primary filtering inductance 21 and the second primary filtering inductance 22 produce a high-frequency insulation, so that components of high frequency f1 originating from the primary antenna (and from the downlink communication) do not disturb the operation of the power bridge 8 and of the components upstream of the power bridge 8 (that is to say, components situated to the left of the power bridge 8 in FIG. 1).

To receive the downlink data, the primary circuit 1 comprises primary reception components comprising a second primary capacitance 25, a primary transformer 26, a third primary capacitance 27 and a primary demodulator 28.

The primary transformer 26 comprises a first primary winding 29 and a second primary winding 30.

The second primary capacitance 25 is mounted in series with the first primary capacitance 5. The first primary winding 29 is connected in parallel to the second primary capacitance 25. The third primary capacitance 27 is mounted in parallel to the second primary winding 30.

The inductance values of the first primary winding 29, of the second primary winding 30, and the values of the second primary capacitance 25 and of the third primary capacitance 27 are chosen so that these components form a second primary resonant circuit at the high frequency f1.

The primary demodulator 28 is mounted in parallel to the second primary winding 30. The primary demodulator 28 is arranged to demodulate high frequency signals f1. The primary demodulator 28 extracts the downlink data from the voltage at the terminals of the second primary winding 30 and of the third primary capacitance 27.

The second primary resonant circuit makes it possible to optimize the reception of the downlink data at high frequency f1 emitted by the secondary circuit in the downlink communication.

Figure 4:
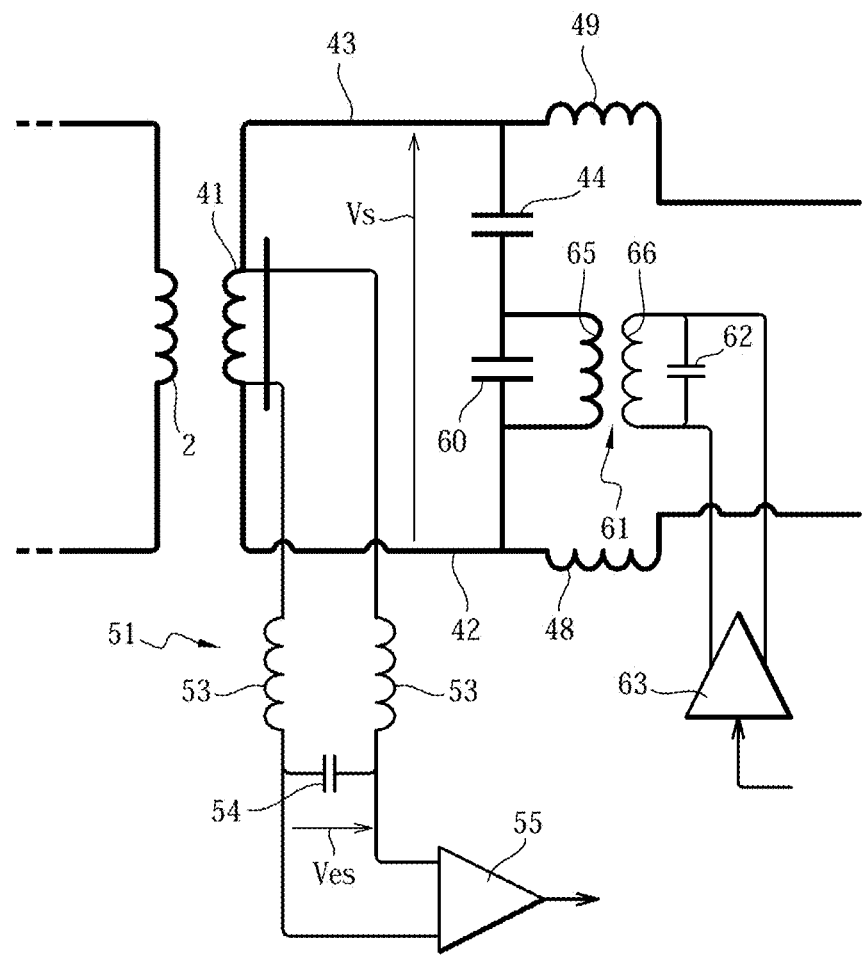
FIG. 4 represents the secondary circuit.

Referring to FIGS. 1 and 4, the secondary circuit 40 comprises, first of all, the secondary antenna which, here, is a winding of conductive wire exhibiting a first secondary inductance 41. The first secondary inductance 41 comprises two terminals, of which one is linked to a first secondary conductor 42 and the other is linked to a second secondary conductor 43.

A first secondary capacitance 44 is mounted in parallel to the first secondary inductance 41. The value of the first secondary inductance 41 and the value of the first secondary capacitance 44 are chosen so that the first secondary inductance 41 and the first secondary capacitance 44 form a first secondary resonant circuit at the low frequency f0.

The use of the first secondary resonant circuit makes it possible to maximize the secondary voltage Vs at the terminals of the first secondary resonant circuit. The secondary voltage Vs is generated, via the inductive coupling, by the power emitted by the primary circuit 1.

The inductive coupling, and therefore the setting of the first primary resonant circuit and of the first secondary resonant circuit, is optimized to maximize the secondary voltage Vs and to ensure a good quality of reception of the uplink and downlink data.

The secondary circuit 40 comprises secondary reception components for reception the emitted power and the uplink data.

To receive the emitted power, the secondary reception components comprise four diodes forming a diode bridge 45 forming a full-wave rectifier.

A first filtering capacitance 46 is mounted at the output and in parallel to the diode bridge 45.

The diode bridge 45 rectifies the secondary voltage Vs, which is an alternating voltage, so that a power supply voltage Va at the terminals of the first filtering capacitance 46 is a direct voltage.

The secondary circuit 40 also comprises a first secondary filtering inductance 48 mounted on the first secondary conductor 42 and a second secondary filtering inductance 49 mounted on the second secondary conductor 43. The first secondary filtering inductance 48 and the second secondary filtering inductance 49 produce a high-frequency insulation, so that components at high frequency f1 originating from the downlink communication do not disturb the operation of the diode bridge 45 and of the components downstream of the diode bridge (that is to say components situated to the right of the diode bridge 45 in FIG. 1).

To receive the uplink data transmitted by the primary circuit 1, the secondary reception components comprise filtering components 51, a voltage sensor and a secondary demodulator 52.

The filtering components 51 comprise two filtering inductances 53 each connected to a distinct terminal of the first secondary inductance 41, and a second filtering capacitance 54 mounted in parallel to the first secondary inductance 41.

The voltage sensor comprises acquisition components 55 and measurement components 56.

The two filtering inductances 53 and the second filtering capacitance 54 eliminate the high-frequency components originating from the downlink communication.

The acquisition components 55 of the voltage sensor acquire a secondary excitation voltage Ves at the terminals of the second filtering capacitance 54.

The secondary demodulator 52 is connected at the output of the acquisition components 55.

The secondary demodulator 52 is arranged to demodulate signals at low frequency f0. The secondary demodulator 52 extracts the uplink data 18 from the secondary excitation voltage Ves.

The measurement components 56 of the voltage sensor, for their part, measure the level of the secondary excitation voltage Ves.

To transmit the downlink data to the primary circuit 1, the secondary circuit 40 comprises secondary emission components here comprising a second secondary capacitance 60, a secondary transformer 61, a third secondary capacitance 62, an emitter 63 and a secondary servocontrol module 64.

The secondary transformer 61 comprises a first secondary winding 65 and a second secondary winding 66.

The second secondary capacitance 60 is mounted in series with the first secondary capacitance 44. The first secondary winding 65 is connected in parallel to the second secondary capacitance 60. The third secondary capacitance 62 is mounted in parallel to the second secondary winding 66.

The inductance values of the first secondary winding 65, of the second secondary winding 66, and the values of the second secondary capacitance 60 and of the third secondary capacitance 62 are chosen so that these components form a second secondary resonant circuit at the high frequency f1.

The downlink data 68 are received by the secondary servocontrol module 64. The secondary servocontrol module 64 transmits them to the emitter 63 which creates a modulated current carrying the downlink data 68.

The downlink data 68 are injected into the secondary voltage Vs at the terminals of the first secondary resonant circuit via the secondary transformer 61. The secondary voltage Vs is therefore modulated as a function of the downlink data 68.

By virtue of the inductive coupling, the modulation of the secondary voltage Vs modulates the primary voltage Vp, and the downlink data 68 are recovered by the primary circuit 1 via the primary transformer 26.

The secondary servocontrol module 64 receives the measurements of the level of the secondary excitation voltage Ves. The secondary servocontrol module 64 includes, in the downlink data 68, the measurements of the level of the secondary excitation voltage Ves.

Thus, a second servocontrol loop is implemented by the primary circuit 1 and by the secondary circuit 40. When the primary circuit 1 receives the measurements of the level of the secondary excitation voltage Ves contained in the downlink data 68, the primary circuit 1 adapts the power emitted so that the level of the secondary voltage Vs, of which the level of the secondary excitation voltage Ves is an image, corresponds precisely to the expected value.

Note that, at the moment when the line-replaceable module is positioned in the slot of the storage rack, the modification of the current consumed by the power bridge 8 of the primary circuit 1 so that the secondary voltage Vs corresponds to the expected value can be used to detect the presence of the line-replaceable module. The system is designed for a minimal operation upon the reception of the smallest excitation signal, that is to say when the primary circuit 1 is in an idle mode awaiting the positioning of the line-replaceable module in the slot.

In addition to the secondary circuit 40 which has just been described, the line-replaceable module comprises a processing component, for example a microcontroller or an FPGA or a processor. The processing component is arranged in particular to execute instructions of software that has to be downloaded into the processing component.

The line-replaceable module also comprises downloading components which make it possible to download the software into the processing component.

The line-replaceable module further comprises power supply components intended to power all of the components of the line-replaceable module. The power supply components comprise in particular a converter 70 and a storage component 71 (visible in FIG. 1).

The line-replaceable module also comprises protection components by virtue of which the line-replaceable module conforms to requirements of electromagnetic compatibility and of lightning specified by the main system manufacturer or by the aircraft manufacturer.

Among the components which have just been cited, there are electrochemical capacitors.

The power supply voltage Va at the terminals of the first filtering capacitance 46 is converted into a storage voltage by the converter 70. The storage voltage 70 is applied to the terminals of the storage component 71 which stores the emitted power received by the secondary circuit 40.

A stored energy is thus available during the storage of the line-replaceable module, while the latter is not connected to any energy source other than the primary circuit 1.

The stored energy can be used to power the downloading components and the processing component. The uplink data can then contain a software configuration, which will be downloaded into the processing component by virtue of the downloading components.

The stored energy can also be used to power any components of the line-replaceable module to establish an uplink communication or a downlink communication with the primary circuit.

The stored energy can also be used to power up the electrochemical capacitors. The degrading thereof by remaining not powered up for a long time is thus avoided.

Advantageously, the line-replaceable module is equipped with an electronic tag of RFID (radio frequency identification) type, which makes it possible to identify the line-replaceable module. The electronic tag needs to be powered by a stand-alone energy source when upgraded functionalities have to be embedded. The stand-alone energy source here comprises capacitors. These capacitors are themselves charged by the energy stored in the storage component 71. An interesting alternative to the use of batteries, the management and operational maintenance of which are sources of difficulties, is thus obtained. The line-replaceable module can thus be interrogated remotely by a conventional RFID reader, without presenting the drawback of maintaining these batteries.

Before positioning the line-replaceable module in the slot of the rack, the line-replaceable module is packaged in a tight and electrically insulating protective cover. The protective cover is then sealed. The line-replaceable module is thus protected from dust, from oxidizing gases and from mechanical attacks. The sealing of the protective cover guarantees that the protective cover has not been opened.

The protective cover is put in place after the equipotential checking tests carried out during the production phase.

During the storage phase, a software configuration can be downloaded into the line-replaceable module by using the uplink data, through the protective cover and by virtue of the inductive coupling.

Likewise, the capacitors of the line-replaceable module can be powered up through the protective cover by using the emitted power.

The protective cover is removed only when the line-replaceable module leaves the storage phase to be mounted on an aircraft. Thus, the line-replaceable module is perfectly protected from the production phase to the moment when it is mounted on the aircraft for a long period, sometimes of several years.

When the line-replaceable module is mounted on the aircraft, it is positioned in an avionics rack with other line-replaceable modules. In addition to the line-replaceable modules, the avionics rack comprises a box comprising slots for accommodating the line-replaceable modules. The slots of the avionics rack do not comprise any primary circuit. On the contrary, the box comprises an electrically conductive element, in this case a metal rail. The metal rail extends with respect to the secondary antennas of the line-replaceable modules, so as to create an electromagnetic screen and to render the secondary antennas inoperative. Any risk of hacking of the line-replaceable modules is thus avoided, and compromising the conformity of the line-replaceable modules to the requirements of electromagnetic compatibility is avoided.

Obviously, the invention is not limited to the embodiment described but encompasses any variant falling within the scope of the invention as defined by the claims.

Although it has been indicated here that each slot of the storage rack, which accommodates a single line-replaceable module, comprises a primary circuit comprising a primary antenna, it is possible to use one and the same primary antenna to transmit the power and exchange data with several line-replaceable modules.

The invention does not apply only to a storage phase of the line-replaceable module, but can be implemented during a production phase or an operational phase. The rack is then no longer a storage rack, but a test rack (in production phase) or an avionics rack (in operational phase).

The invention claimed is:

1. A system comprising a rack and at least one line-replaceable module, the rack comprising a slot for accommodating the line-replaceable module, the rack further comprising a primary transmission circuit comprising a primary antenna, primary emission components arranged to generate an emitted power containing uplink data, and primary reception components arranged to receive downlink data, the line-replaceable module comprising a secondary transmission circuit comprising a secondary antenna, secondary reception components arranged to receive the emitted power and the uplink data, and secondary emission components arranged to generate the downlink data, the emitted power, the uplink data and the downlink data being transmitted via one and the same coupling between the primary antenna and the secondary antenna.

2. The system as claimed in claim 1, wherein the primary emission components comprise a two-phase generator L.

3. The system as claimed in claim 2, wherein the primary emission components further comprise a non-inverting amplifier and an inverting amplifier linked to the two-phase generator L, an output of the non-inverting amplifier being connected to a first primary conductor linked to a first terminal of the primary antenna, an output of the inverting amplifier being connected to a second primary conductor linked to a second terminal of the primary antenna.

4. The system as claimed in claim 1, wherein the coupling is an inductive coupling.

5. The system as claimed in claim 1, wherein the emitted power and the uplink data are transmitted with a low bit rate, and the downlink data are transmitted with a high bit rate.

6. The system as claimed in claim 5, wherein the low bit rate lies between 100 kb/s and 1 Mb/s, and the high bit rate lies between 10 Mb/s and 100 Mb/s.

7. The system as claimed in claim 1, wherein the emitted power which is received by the secondary transmission circuit is used in particular to power up a capacitor of the line-replaceable module.

8. The system as claimed in claim 1, wherein the emitted power which is received by the secondary transmission circuit is used in particular to power downloading components of the line-replaceable module, and wherein the uplink data contain a software configuration downloaded into a processing component of the line-replaceable module.

9. The system as claimed in claim 1, wherein the downlink data are used in particular to control a primary voltage (Vp) generated by the primary emission components.

10. The system as claimed in claim 1, wherein the line-replaceable module is packaged in a tight, electrically insulating and sealed protective cover.

11. A method for storing a line-replaceable module in a rack of the system as claimed in claim 1, the storage method comprising the steps:
    of packaging the line-replaceable module in a tight and electrically insulating protective cover;
    of sealing the protective cover;
    of positioning the line-replaceable module in the slot of the rack.

12. The storage method as claimed in claim 11, further comprising the step of powering up of the capacitors of the line-replaceable module by using the emitted power.

13. The storage method as claimed in claim 12, further comprising the step of downloading a software configuration into the line-replaceable module by using the uplink data.

14. A line-replaceable module comprising a secondary transmission circuit comprising a secondary antenna, secondary reception components arranged to receive an emitted power and uplink data contained in the emitted power, and secondary emission components arranged to generate downlink data, the line-replaceable module being arranged to implement the storage method as claimed in claim 11.

15. The line-replaceable module as claimed in claim 14, the line-replaceable module being packaged in a tight, electrically insulating and sealed protective cover.

16. An avionics rack comprising a box and a plurality of line-replaceable modules as claimed in claim 14, the avionics rack comprising an electrically conductive element positioned with respect to the line-replaceable modules to render the secondary antennas of the line-replaceable modules inoperative.

* * * * *